United States Patent
Busch

(10) Patent No.: US 10,851,883 B2
(45) Date of Patent: *Dec. 1, 2020

(54) METHOD FOR SHIFTING AN AUTOMATIC TRANSMISSION

(71) Applicant: Voith Patent GmbH, Heidenheim (DE)

(72) Inventor: Jörg Busch, Königsbronn-Zang (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/359,720

(22) Filed: Mar. 20, 2019

(65) Prior Publication Data
US 2019/0219141 A1 Jul. 18, 2019

Related U.S. Application Data

(63) Continuation of application No. PCT/EP2017/072041, filed on Sep. 4, 2017.

(30) Foreign Application Priority Data

Sep. 21, 2016 (DE) .......................... 10 2016 218 114

(51) Int. Cl.
*F16H 61/70* (2006.01)
*F16H 47/08* (2006.01)

(52) U.S. Cl.
CPC ........... *F16H 47/085* (2013.01); *F16H 61/70* (2013.01)

(58) Field of Classification Search
CPC ............................... F16H 61/70; F16H 47/085
USPC ........................................................... 475/47
See application file for complete search history.

(56) References Cited

U.S. PATENT DOCUMENTS

| | | | | |
|---|---|---|---|---|
| 2,959,985 A | * | 11/1960 | Moore .................. | F16H 47/085 475/38 |
| 3,217,563 A | * | 11/1965 | Simpson ............... | F16H 47/085 475/54 |
| 3,292,455 A | * | 12/1966 | Welch ................... | F16H 47/085 475/58 |

(Continued)

FOREIGN PATENT DOCUMENTS

DE 10 2006 013 180 A1 10/2006
EP 2 162 643 B1 3/2012

OTHER PUBLICATIONS

Notice of Transmission of the International Research Report and the Written Notice Issued the International Searching Authority or Declaration dated Dec. 4, 2017 for International Application No. PCT/EP2017/072041 (11 pages).

(Continued)

*Primary Examiner* — Leslie A Nicholson, III
(74) *Attorney, Agent, or Firm* — Taylor IP, P.C.

(57) ABSTRACT

A method for shifting an automatic transmission, including a drive region, a hydrodynamic converter, an output region, and exactly one planetary gear that acts in a first operating state and a second operating state. In order to shift to different gears of the automatic transmission, different transmission ratios are set in the strictly mechanical power branch by disengaging and engaging clutches and/or brakes in the drive region. The planetary gear set in the output region in the case of at least two different transmission ratios in the strictly mechanical power branch, the rotational movement transmitted by the strictly mechanical power branch is stepped up, in order to always set additional gears.

8 Claims, 3 Drawing Sheets

(56) References Cited

U.S. PATENT DOCUMENTS

| | | | | |
|---|---|---|---|---|
| 3,299,746 A * | 1/1967 | Konrad | ............... | F16H 47/085 |
| | | | | 475/54 |
| 3,486,398 A | 12/1969 | Waclawek | | |
| 3,592,079 A * | 7/1971 | Mori | ............... | F16H 3/663 |
| | | | | 475/56 |
| 3,620,100 A * | 11/1971 | Chana | ............... | F16H 47/085 |
| | | | | 475/54 |
| 5,030,178 A * | 7/1991 | Ming-Luen | ............. | F16H 37/086 |
| | | | | 475/36 |
| 5,156,577 A | 10/1992 | Fredriksen et al. | | |
| 5,299,985 A * | 4/1994 | Johnston | ............... | F16H 47/085 |
| | | | | 192/58.4 |
| 7,507,175 B2 * | 3/2009 | Vornehm | ............... | F16H 47/08 |
| | | | | 475/36 |
| 8,453,440 B2 * | 6/2013 | Busch | ............... | F16H 41/30 |
| | | | | 60/337 |
| 8,491,433 B2 * | 7/2013 | Busch | ............... | F16H 47/085 |
| | | | | 475/59 |
| 8,939,859 B2 * | 1/2015 | Jawalkar Nagaraj | ... | F16H 41/04 |
| | | | | 475/35 |
| 2008/0293533 A1 | 11/2008 | Rodgers, II | | |
| 2011/0023475 A1 * | 2/2011 | Busch | ............... | F16H 47/085 |
| | | | | 60/361 |

OTHER PUBLICATIONS

German Office Action dated May 22, 2017 for German Application No. 10 2016 218 114.9 (5 pages).

* cited by examiner

METHOD FOR SHIFTING AN AUTOMATIC TRANSMISSION

CROSS REFERENCE TO RELATED APPLICATIONS

This is a continuation of PCT application No. PCT/EP2017/072041, entitled "METHOD FOR SHIFTING AN AUTOMATIC TRANSMISSION", filed Sep. 4, 2017, which is incorporated herein by reference.

BACKGROUND OF THE INVENTION

1. Field of the Invention

The present invention relates to a method for shifting an automatic transmission.

2. Description of the Related Art

In a generic transmission a combined hydrodynamic and mechanic power transmission from a transmission input shaft to a transmission output shaft is set in a first gear. For this purpose a hydrodynamic power branch is provided through the hydrodynamic converter and parallel thereto a strictly mechanical power branch around the converter, wherein the drive power transmission occurs simultaneously and parallel via these two power branches. To create additional gears, the transmission of power from the transmission input shaft to the transmission output shaft occurs exclusively mechanically via the strictly mechanical power branch bypassing the hydrodynamic converter.

In the generic transmission it is already suggested to supplement the conventional number of gear steps—which are shifted via the combined hydrodynamic mechanic gear as gear, and three strictly mechanical gears which are shifted by setting various transmission ratios in one drive region of the hydrodynamic transmission before the hydrodynamic converter—with a fifth gear due to the fact that, originating from the fourth gear the rotational movement transmitted via the strictly mechanical power branch is stepped up with a planetary gear set in the output region of the transmission. In contrast thereto, in the combined hydraulic mechanical gear, the planetary gear set is operated as a summation gearbox in order combine the drive power quotas transmitted via the hydrodynamic power branch and the strictly mechanic power branch and in order to transmit the combined output to the transmission output shaft.

What is needed in the art is an improved shifting method for an automatic transmission.

SUMMARY OF THE INVENTION

The present invention provides a method for shifting an automatic transmission to improve shifting in such a way that when utilizing the transmission in a vehicle power train between the drive motor and the drive wheels an energetically more advantageous mode of operation of the vehicle is possible, in particular, a lower fuel consumption by the vehicle.

The automatic transmission of the present invention includes various power branches and a hydrodynamic converter so that drive power can be transmitted in a first gear hydrodynamically, especially hydrodynamically and mechanically combined from a transmission input shaft to a transmission output shaft; and in another gear or in other gears exclusively mechanically. The transmission may be notably designed generically pursuant to the transmission described in European patent document EP 2 162 643 B1.

The method according to the present invention provides that for shifting an automatic transmission comprising a drive region, a hydrodynamic converter and an output region, wherein exactly one planetary gear set is provided in the output region, which acts, in a first operating state as a summation gearbox for simultaneous parallel drive power transmission via the hydrodynamic converter in a hydrodynamic power branch and around the hydrodynamic converter in a strictly mechanical power branch. In a second operating state steps up a rotational movement transmitted via the strictly mechanical power branch, wherein in order to shift to different gears of the automatic transmission, different transmission ratios are set in the strictly mechanical power branch by disengaging and engaging in particular multi-disk design clutches and/or brakes, wherein the clutches and/or brakes are located in the drive region.

According to the present invention—in the case of at least two different transmission ratios in the strictly mechanical power branch, in other words in two different mechanical gears of the automatic transmission—the planetary gear set in the output region steps up the rotational movement transmitted by the strictly mechanical power branch, in order to always set an additional gear relative to the aforementioned various gears.

According to the present invention it is thus not only possible—as is the case in the discussed state of the art—to provide a fifth gear in addition to the previously highest fourth gear, wherein due to stepping up the gearing ratio in the planetary gear set the output shaft of the transmission rotates faster in the output region in fifth gear compared to fourth gear, but also a relevant speed-up ratio so that the output shaft of the transmission rotates faster can also be utilized in lower gears, for example in second and/or third gear. In other words, not only in the highest gear. Thus, additional gears in the embodiment of intermediate gears can be created, wherein especially the ratios of the different gears can be selected such that there is no overlap between the "full" gears. In other words between the gears without speed-up ratio in the planetary gear set in the output region and the intermediate gears, that is with speed-up ratio in the planetary gear set in the output region.

Shifting in the planetary gear set in order to electively set the speed-up ratio can occur for example via a clutch but alternatively also via a brake. Clutch and/or brake can be of multi-disk design. However, a jaw clutch is used in most cases.

The planetary gear set can be in the output region in all the various transmission ratios in the strictly mechanical power branch, and the rotational movement can be transmitted via the strictly mechanical power branch which speeds up for setting of additional gears.

By increasing the number of possible gears, setting of the respective optimum speed-torque ratio between the transmission input shaft and the transmission output shaft that is adapted to the current and future driving situation can be achieved with an anticipatory switching logic that utilizes for example the signals from a satellite system, for example GPS. Based on the current state of the art, the additional gears can herein be achieved advantageously merely by changing the transmission software, the result of which is low additional costs with simultaneously great benefits.

Setting of the various transmission ratios in the drive region occurs advantageously without tractive power interruption, in particular due to exclusive utilization of multi-disk design shifting elements (clutches and/or brakes). Alternatively, jaw-type clutches can be provided.

According to one embodiment of the present invention, a sun wheel of the planetary gear set is secured in the output region for setting of one of the aforementioned intermediate gears, for example by way of a multi-disk designed brake which, in particular can act against the transmission housing.

A power input of the planetary gear set for connection of the strictly mechanical power branch is provided in the embodiment of a planetary carrier—also referred to as a bridge. According to one embodiment, the power output of the planetary gear set is provided optionally in the embodiment of the same planetary carrier, if no ratio is to be produced or, in the embodiment of a ring gear—the latter if a ratio is to be produced. Accordingly, the transmission output shaft is connected either directly or indirectly in a drive connection with the planetary carrier or with the ring gear, in particular rotationally fixed.

When using the planetary gear set as a summation gear, the sun wheel can be used as input for connection of the hydrodynamic power branch, and the planetary carrier for connection of the strictly mechanical power branch, wherein the ring gear is fixed, in particular by way of a brake, for example of multi-disk design, advantageously for securing the ring gear with respect to the transmission housing. Here too, the transmission output shaft can be connected directly or indirectly with the planetary carrier which receives power directly from the strictly mechanical power branch and via at least one planetary gear that meshes with the ring gear from the hydrodynamic power branch.

For selective connection of the ring gear and the planetary carrier with the transmission output shaft, a claw clutch can be provided which can be configured synchronized or non-synchronized depending on whether a speed equalizer is provided.

An electric machine can be integrated in the transmission in order to create a hybrid power train if the transmission input shaft is connected to a combustion engine.

The pump wheel of the hydrodynamic converter can be selectively fastened, for example by way of a multi-disk brake, in particular with respect to the transmission housing. Fastening is then advantageously set in all strictly mechanical gears.

The reverse gear of the transmission can for example be provided exclusively by drive power transfer via the hydrodynamic power branch.

The planetary gear set in the output region is also referred to as overdrive.

According to one embodiment of the present invention, the planetary carrier of the planetary gear set can also be fastened in the output region—in particular by way of a claw clutch—with respect to the housing and/or by way of a brake, again in particular one of multi-disk design.

According to one embodiment of the present invention, a hydrodynamic retarder is provided in the transmission in addition to the hydrodynamic converter, wherein the hydrodynamic retarder can be designed as primary retarder or as secondary retarder. The hydrodynamic retarder can be advantageously positioned in the output region, for example on the transmission output shaft behind the planetary gear set. It is optional as to whether the rotor is located between the planetary gear set and the stator of the transmission, or the stator between the planetary gear set and the rotor.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 1:
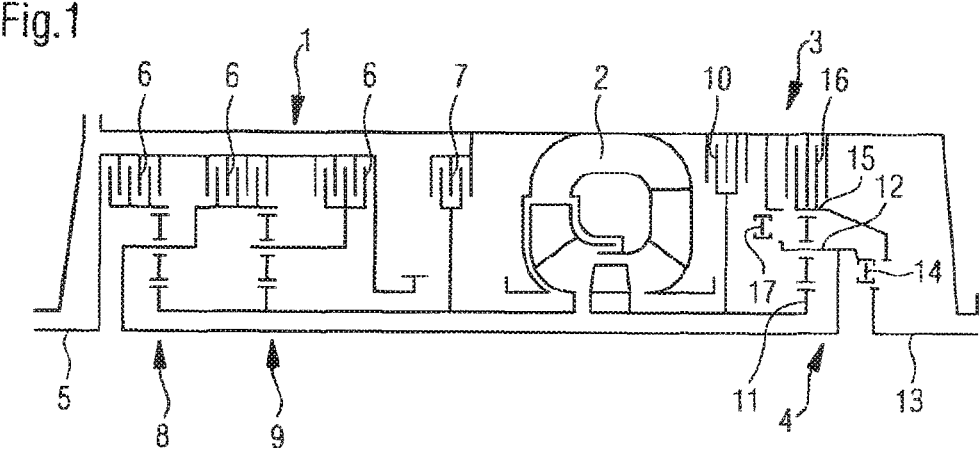
FIG. 1 illustrates an automatic transmission, wherein the inventive method can be utilized.

FIG. 1 illustrates an automatic transmission featuring a drive region 1, a hydrodynamic converter 2 and an output region 3, wherein precisely one planetary gear set 4 is provided in output region 3. In drive region 1, that is originating from hydrodynamic converter 2 on the side of the transmission input shaft 5, various brakes 6 of multi-disk design are shown with which the individual components of the two interconnected planetary gear sets 8, 9 of drive region 1 can be optionally secured. Moreover, a so-called pump brake 7 is provided in order to secure the pump wheel of hydrodynamic converter 2. Thus, various ratios can be set in drive region 1 in order to create various gears in the transmission.

The turbine wheel of hydrodynamic converter 2 can be secured by a turbine brake 10 which, in this case is also of multi-disk design. The brake at the same time also secures sun wheel 11 of planetary gear set 4 in output region 3.

Planetary carrier 12 of planetary gear set 4 can be connected via jaw clutch 14 with transmission output shaft 13. Transmission output shaft 13 can moreover be connected by means of said jaw clutch 14 with ring gear 15 of planetary gear set 4.

Ring gear 15 of planetary gear set 4 can be secured via brake 16, again with respect to the transmission housing.

Planetary carrier 12 of planetary gear set 4 in drive region 3 can be secured by means of jaw clutch 17, also with respect to the transmission housing.

Figure 2:
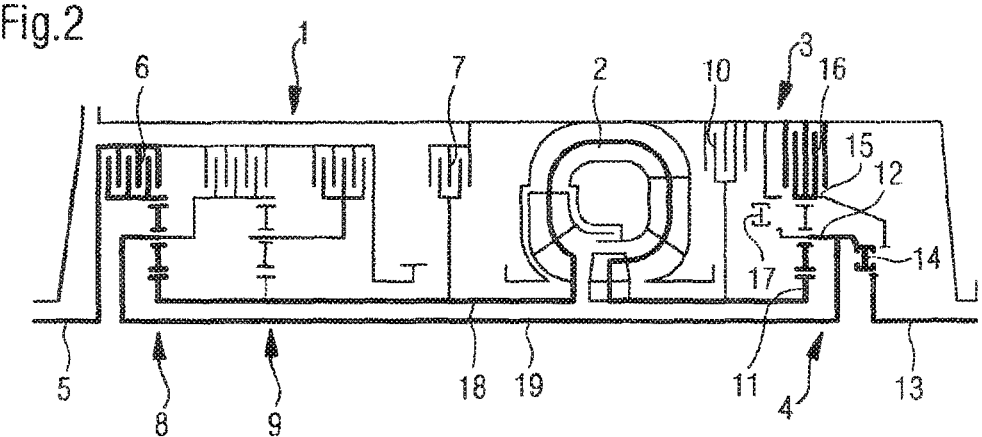
FIG. 2 illustrates a first gear of the automatic transmission.

The setting of the first gear of the automatic transmission is illustrated in FIG. 2, wherein the first gear is designed as combined hydrodynamic mechanical gear. Accordingly, planetary gear set 4 is used as summation gearbox in order to add together the drive power from hydraulic power branch 18 and the strictly mechanical power brand 19.

Regarding the power flow, we refer to the process flow illustrated with the emphasized lines. A brake 6 in drive region 1 is shifted in order to connect the ring gear of planetary gear set 8 with transmission input shaft 5. Ring gear 15 of planetary gear set 4 in output region 3 is secured by means of brake 16 and planetary carrier 12 of planetary gear set 4 in output region 3 is connected via jaw clutch 14 with transmission output shaft 13.

Figure 3:
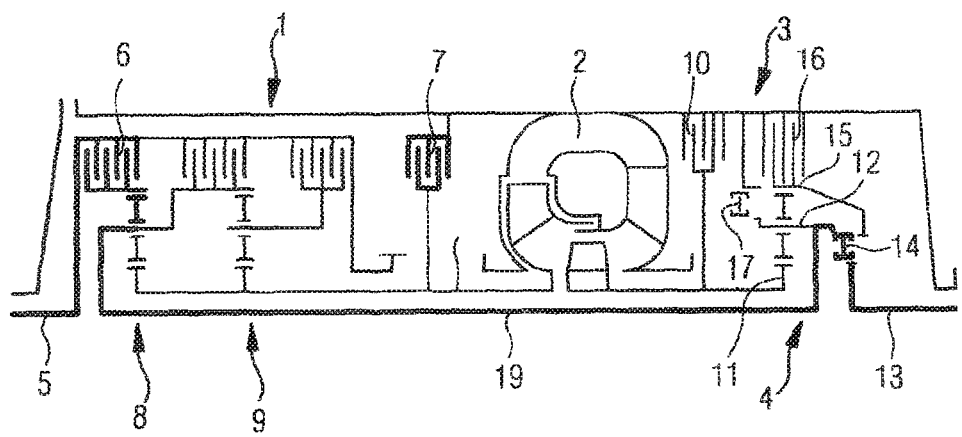
FIG. 3 illustrates a second gear of the automatic transmission.

FIG. 3 illustrates the power flow in second gear, wherein in this case a strictly mechanical power transfer occurs exclusively via the strictly mechanical power branch 19. No speed-up ratio occurs in planetary gear set 4 in output region 3, or respectively no transmission ratio at all, so that the output of the strictly mechanical power branch 19 rotates with the same speed as transmission output shaft 13. For this purpose, planetary carrier 12 of planetary gear set in output region 3 is connected via clutch 14 to transmission output shaft 13. Pump brake 7 is closed, turbine brake 10 is open in contrast to FIG. 2, where both brakes 7, 10 must be open for the hydrodynamic power transfer.

Figure 4:
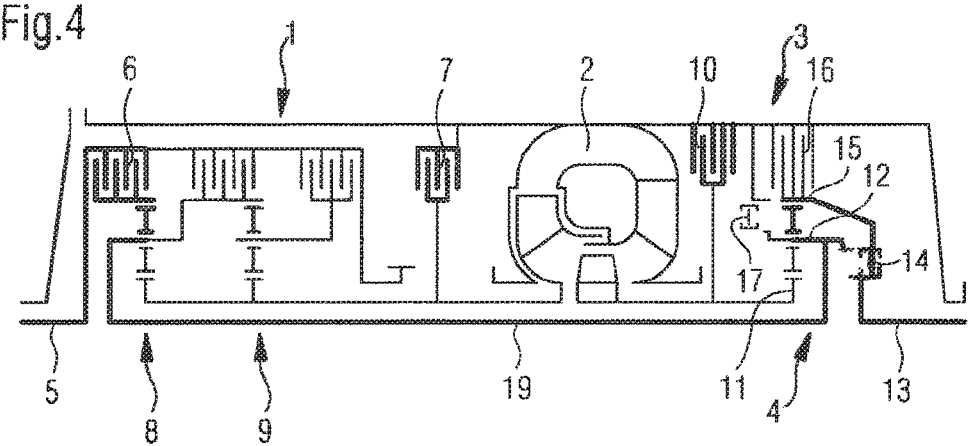
FIG. 4 illustrates the second gear with overdrive of the automatic transmission, in which the turbine brake is closed and the transmission output shaft is connected with the ring gear of the planetary gearset.

FIG. 4 shows that for shifting a second gear with overdrive, turbine brake 10 was also closed and transmission output shaft 13 was connected with ring gear 15 of planetary gearset 4 in output region 3—in this case via jaw clutch 14. Strictly mechanical power branch 19 moves planetary carrier 12 so that a speed up ratio is produced in planetary gear set 4. Apart from that, the shifting position remains unchanged in accordance with the position in FIG. 3.

Figure 5:
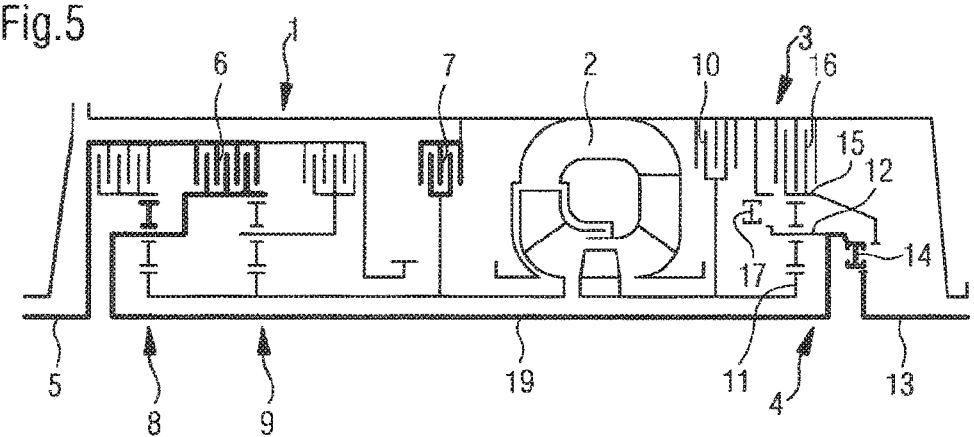
FIG. 5 illustrates a third gear of the automatic transmission.

Compared to the shifting positions in FIGS. 3 and 4 in drive region 1, another brake 6 is closed in FIG. 5, in order to set the third gear. Specifically, the planetary carrier of planetary gear set 8 in this case is connected with transmission input shaft 5. As a result, the third gear is set. Apart from that, the shifting position remains unchanged in accordance with the position in FIG. 3.

Figure 6:
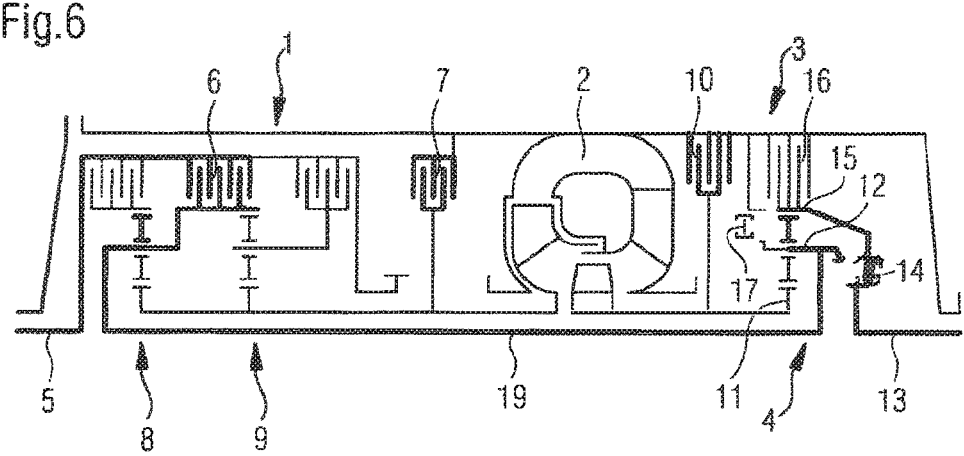
FIG. 6 illustrates the third gear with overdrive.

In FIG. 6, the shifting position that is illustrated in FIG. 5 is now changed by changing the drive power flow via planetary gear set 4 in output region 3—analog to the illustration in FIG. 4—in order to set the third gear with overdrive.

Figure 7:
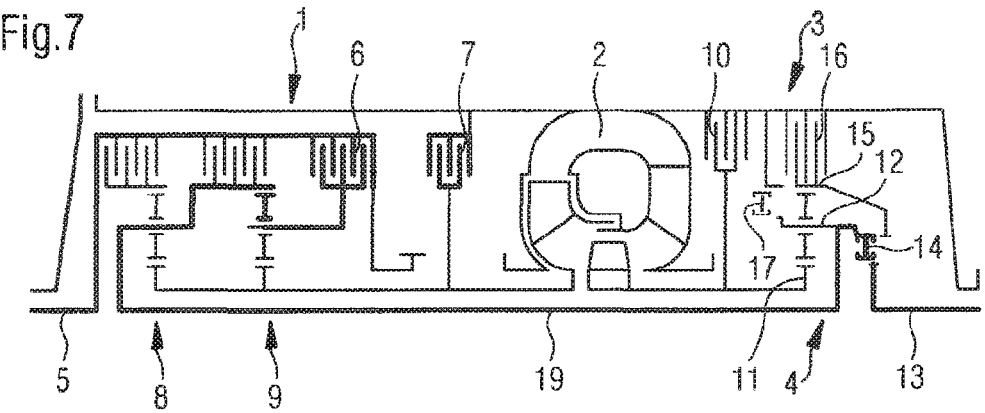
FIG. 7 illustrates a fourth gear of the automatic transmission.

In FIG. 7 the fourth gear is set, in this case by closing third brake 6 in drive region 1, wherein the planetary carrier of planetary gear set 9 is connected with transmission input shaft 5. No ratio is set in planetary gear set 4 in output region 3.

Figure 8:
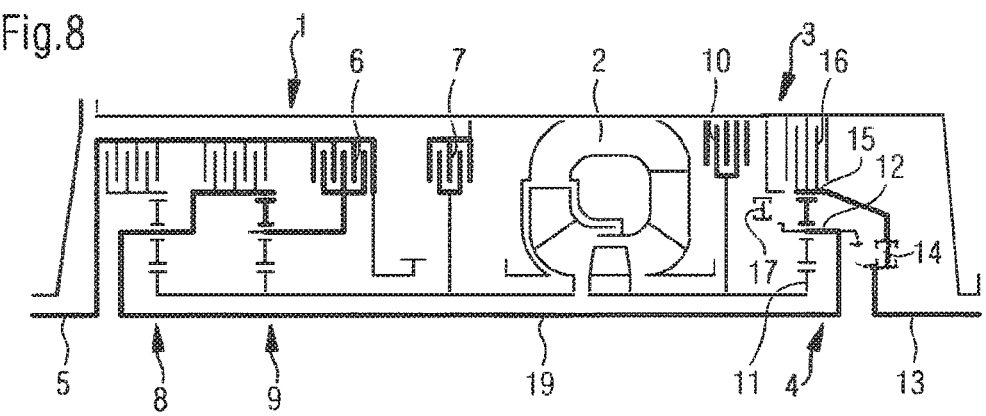
FIG. 8 illustrates the fourth gear with overdrive of the automatic transmission.

FIG. 8 shows again utilization of the overdrive in order to set an additional gear—the fourth gear with overdrive. Apart from that, the shifting position is consistent with that in FIG. 7.

Figure 9:
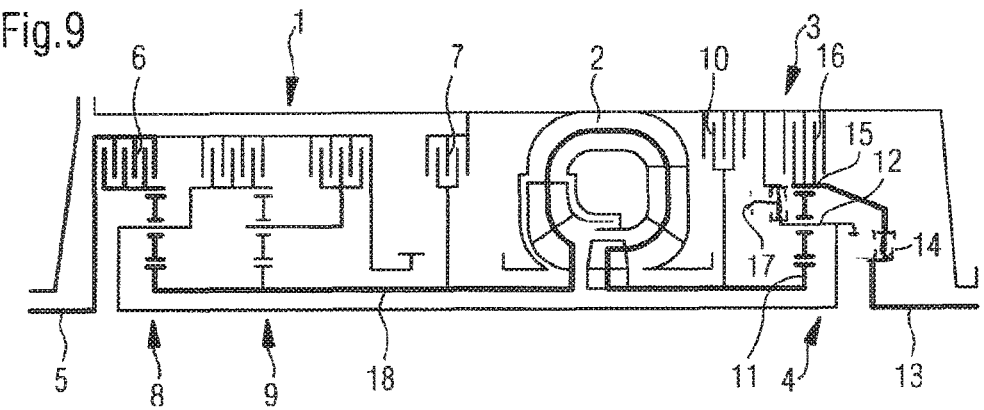
FIG. 9 illustrates a reverse gear of the automatic transmission.

FIG. 9 illustrates setting of the reverse gear, wherein in this case the drive power is transferred exclusively via hydrodynamic power branch 18.

Transmission input shaft 5 and transmission output shaft 13 rotate opposite to one another. In principle, rotation in opposite directions could also be provided in forward gears, and rotation in the same directions in reverse gears, depending on specific installation of the transmission in the remaining power train.

Figure 10:
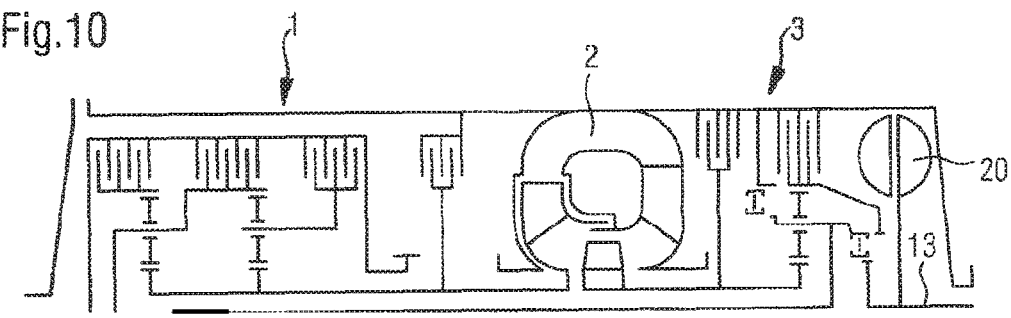
FIG. 10 illustrates a deviating design with an additional hydrodynamic retarder.

In the arrangement according to FIG. 10 a hydrodynamic retarder 20 is additionally positioned on transmission output shaft 13. In particular, the rotor of hydrodynamic retarder 20 is supported directly by transmission output shaft 13.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for shifting an automatic transmission, comprising:
   providing the automatic transmission with a drive region, a hydrodynamic converter, an output region, at least one of clutches and brakes in the drive region, and exactly one planetary gear set in the output region, the planetary gear set acts in a first operating state as a summation gearbox for simultaneous parallel drive power transmission via the hydrodynamic converter in a hydrodynamic power branch and around the hydrodynamic converter in a strictly mechanical power branch and in a second operating state to step up a rotational movement transmitted via the strictly mechanical power branch;
   setting different transmission ratios in the strictly mechanical power branch by disengaging and engaging at least one of the clutches and the brakes in the drive region in order to shift to different gears of the automatic transmission; and
   stepping up, by the planetary gear set, the rotational movement transmitted via the strictly mechanical power branch in at least two different transmission ratios in the strictly mechanical power branch for setting additional gears relative to the gears of the automatic transmission.

2. The method according to claim 1, wherein via the planetary gear set in the output region, in all the various transmission ratios in the strictly mechanical power branch, the rotational movement transmitted via the strictly mechanical power branch is always stepped up for setting of the additional gears.

3. The method according to claim 1, wherein the planetary gear set includes a sun wheel that is secured for setting of an additional gear.

4. The method according to claim 1, wherein the automatic transmission further includes a transmission output shaft, and the strictly mechanical power branch in the drive region includes four different transmission ratios that are set electively for setting of specifically four mechanical gears, wherein a power input of the planetary gear set is rotationally fixed with the transmission output shaft to avoid a ratio in the planetary gear set.

5. The method according to claim 1, wherein the automatic transmission further includes a transmission output shaft, and the step of setting the additional gears includes connecting a power output of the planetary gear set, in the form of a ring gear, with the transmission output shaft, in order to produce a ratio in the planetary gear set.

6. The method according to claim 5, further including a step of setting a gear with a power transfer via the hydrodynamic power branch and simultaneously via the strictly mechanical power branch, and a turbine wheel of the hydrodynamic converter is connected with a sun wheel of the planetary gear set, an output of the strictly mechanical power branch is connected with a planetary carrier of planetary gear set, and the transmission output shaft is connected with the planetary carrier of the planetary gear set, wherein the ring gear of the planetary gear set is fastened.

7. The method according to claim 1, wherein in the drive region various ratios of the strictly mechanical power branch are transmitted with interconnected planetary gearsets.

8. The method according to claim 1, wherein the automatic transmission further includes a transmission input shaft and a transmission output shaft, and gear ratios between the transmission input shaft and the transmission output shaft in all gears and intermediate gears are shifted relative to one another free of overlap.

* * * * *